May 8, 1934. L. P. CAMPBELL 1,957,758
LAWN MOWER
Filed May 26, 1933
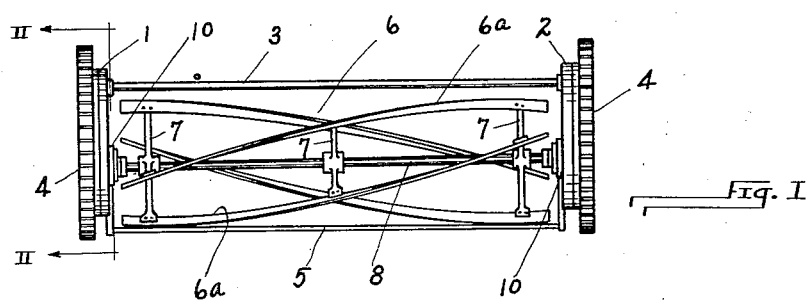
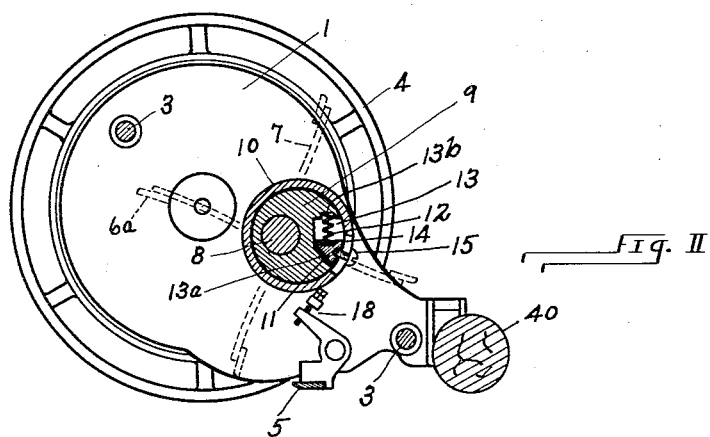
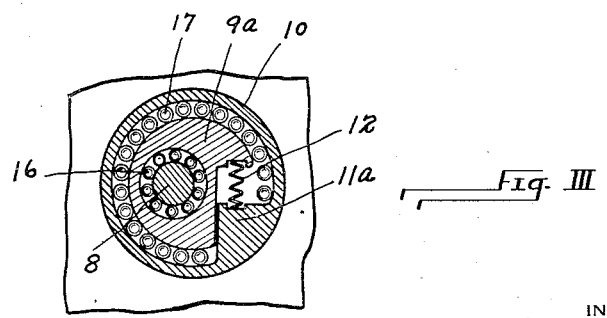
INVENTOR
Lawrence P. Campbell
by Christy Christy and Wharton
his attorneys Patented May 8, 1934

1,957,758

UNITED STATES PATENT OFFICE 1,957,758

LAWN MOWER

Lawrence P. Campbell, Sharpsburg, Pa.

Application May 26, 1933, Serial No. 673,012

4 Claims. (Cl. 56—294)

The invention relates to a mowing machine, particularly a mowing machine of the reel type. Such a machine consists of a frame which supports a rotary cutter-reel in cooperative relation with a cutter-bar; the frame is mounted upon traction wheels for travel over the ground; the cutter-reel is geared to the wheels, and as the machine travels the reel rotates, sweeping its blades successively over the shearing edge of the cutter-bar, and thus cutting the grass or other vegetation to be cropped.

The problem is automatically to maintain the reel and cutter-bar in proper relative positions, to the end that in service each blade of the reel shall engage the cutter-bar throughout its entire effective length and with substantially uniform pressure at all points of contact between blade and bar.

In Patent No. 1,787,471, granted to me January 6, 1931, and in applications Serial No. 640,821, filed November 2, 1932, and Serial No. 650,477, filed January 6, 1933, I have disclosed several structures which have proven effective in the solution of this problem, and my present invention relates to the same general subject matter.

The object of the invention is, in the solution of this problem, to provide means which may be economically manufactured in mass production—means which are durable in service, requiring minimum supervision or adjustment—and means which are compact, and adapted to be housed in such manner as to minimize obstruction and the tendency for the machine to pick-up and snarl grass in its moving parts.

The accompanying drawing illustrates a lawn mower embodying the invention. Fig. I is a view in front elevation of the lawn mower; Fig. II is a view to larger scale, showing in vertical section, on the plane II—II of Fig. I, the bearing structure at one end of the cutter-reel; and Fig. III is a fragmentary view in section, comparable to Fig. II, illustrating a modification in bearing structure.

Referring to the drawing, the lawn-mower comprises two side frame elements 1 and 2, which are rigidly united in spaced relation by means of one or more cross members 3. Traction wheels 4 are mounted on each of the side frame elements 1, 2, and the usual trailing roller 40 cooperates with the wheels, so that the machine is adapted to travel over the ground. Extending between the side frame elements 1, 2 is a cutter-bar 5; the cutter-bar is in the usual manner adjustably secured to the frame elements 1, 2; a cutter-reel 6 is trunnioned at its opposite ends in the frame elements 1, 2; the reel 6 is of well-known structure, and is so organized with the cutter-bar 5 that, as the reel rotates, its blades 6a sweep successively over the cutting edge of the cutter-bar, and shear the grass projecting from the ground over which the mower is propelled. According to usual practice, the cutter-reel may be geared to the traction wheels 4, so that the travel of the machine, in causing rotation of the traction wheels, effects an accompanying rotation of the cutter-reel.

To the end that the machine shall mow effectively and smoothly, it is essential that each blade 6a of the reel shall progressively make contact with the cutter-bar throughout its cutting sweep. As may be observed in Fig. I, the blades 6a are secured by means of radial brackets 7 to the shaft 8 of the reel; the blades are helically disposed with respect to the shaft 8, and are so organized with respect to one another that as one blade, during the rotation of the reel, is completing its sweep across the cutter-bar the next succeeding blade is advancing into position of contact with the cutter-bar. Accordingly, it will be understood that, unless the cutting edges of the blades 6a are at all points in their extents located at the same radial distance from the shaft 8, there will be some intervals (during the rotation of the reel) in which the cutter-blades will fail to make proper contact with the cutter-bar, whereby the mowing effect of the machine will not be uniform. Of course, the last statement assumes that the cutter-bar and the axis of the reel are secured in fixed positions of adjustment.

Inasmuch as it is practically impossible to maintain the blades of a cutter reel in ideal condition, i. e. to maintain all the cutting edges of the reel at uniform radial distance from its axis, the art has proposed either the flexible mounting of the cutter-bar, or the mounting of the cutter-reel in movable bearings, to the end that as the reel revolves the interval between the reel and cutter-bar may be automatically adjusted (in response to the action of the reel blades in sweeping or riding along the shearing edge of the bar). My present invention is directed to an automatically adjustable mounting for a cutter-reel which cooperates with a rigidly or yieldingly mounted cutter-bar.

Such mounting comprises an eccentric bearing 9 for each end of the reel shaft 8. The bearings 9 are each enclosed in a housing 10 formed on the side frames 1, 2. As may be seen in Fig. II, the bearing 9 is in form a cylindrical block, and the end of shaft 8 is journaled eccentrically therein.

Within a predetermined range the eccentric bearing block 9 is rotatable in housing 10. When the block 9 rotates clockwise (Fig. II) the reel shaft 8 rises, and, when the block 9 turns counterclockwise, the reel moves downward. Counterwise turning of the block 9 is positively limited by a stop 11, and clockwise rotation is resisted by a compression spring 12. The block advantageously is recessed at 13, and the stop 11 lies within the recess inwardly of the housing 10. As may be perceived in Fig. II, the lower face 13a of the recess formed in the eccentric bearing block is adapted normally to abut the stop 11 and thus to limit positively counterclockwise turning of the bearing block; between the stop and the face 13b of the recess the spring 12 is organized. The spring yieldingly resists clockwise rotation of the bearing block. Advantageously, the stop 11 is adjustable in the housing 10. Conveniently, the housing is provided with a slot 14, and a setscrew 15 projects through into threaded engagement with the stop. Manifestly the position of the stop may, by means of the screw, be fixed at any point within the extent of the slot. Such a bearing structure is organized on each of the opposite ends of the reel shaft.

When initially preparing the mower for service, the stops 11 at the opposite ends of the reel shaft 8 are so positioned and the eccentric bearings 9 are so adjusted that the "lowest" point on the cutting edges of the reel blades 6a—the point of least radius with respect to the axis of the reel—makes proper contact with the cutter bar 5. All other points on the shearing edges of the reel blades 6a, in lying at greater radial distance from the axis of the reel, will as the reel revolves and swings its blades 6a across the cutter-bar produce upward thrusts upon the reel structure, which thrusts react to raise the shaft 8 and to turn the bearings 9 clockwise against the resistance of springs 12, of Fig. II. When a "low" point on the blade 6a enters into engagement with the cutter-bar 5, the springs 12 become effective to turn the bearings counterclockwise and to move the shaft 8 downward. Accordingly, the interval between the reel axis and the cutter-bar automatically is adjusted. It will be perceived, therefore, that the blades 6a of the reel at all points in their extents make contact with the shearing edge of the cutter-bar, and that such contact is substantially of uniform pressure, due to the effect of the springs 12. I have found, furthermore, that best results are obtained when the cutter-reel, in addition to the automatic adjustment already described, is adapted to tilt longitudinally relatively to the cutter-bar, and it will be noted that the eccentric bearings of my structure, in being severally responsive to the reaction of the reel blades riding over the cutter-bar, admit of such tilting. It will be manifest to the mechanic that a slight tolerance may be provided in the fit of the shaft 8 in the opposite bearings 9, and that the usual gears connecting the traction wheels 4 to the shaft may be loosely mounted upon their axes (or the gears may be formed with sufficient back-lash or tooth clearance), to admit of the tilting of the shaft 8 in the manner described. Accordingly, it will be manifest that one bearing may turn through a small angle, while the other is substantially stationary, or both bearings may turn together. Thus, the reel may move inwardly and outwardly with respect to the cutter-bar, either in a position parallel to the bar, or in a position inclined thereto, so that the desired continuous contact between the cutter blades and the cutter-bar is insured. The adaptability of the reel for tilting from end to end prevents a "high" spot on the edge of one reel blade from shifting the reel so that the next adjacent blade of the cutter reel can not make contact with the cutter-bar. That is, if the left-hand end of an advancing blade is "high," the whole reel is not shifted radially outward of the cutter-bar, but only the left-hand end of the reel is moved outward, so that the right-hand end of the retreating blade may remain in contact with the cutter-bar.

In Fig. III, it will be observed that the reel shaft 8 may be organized with a race 16 of antifriction bearings within the eccentric bearing block 9a, and the bearing block itself may, advantageously, be borne upon a race 17 of such bearings within housing 10. The antifriction bearings characteristically reduce friction to a minimum, and increase the sensitivenss of the bearing in its intended service. I contemplate that the stop (11a) may be formed integrally with the wall of housing 10, whereby the angular turning of the bearing block 9a against the resistance of spring 12 is within a fixed range. The initial adjustment of the parts (to bring the "low" point of the reel blades into contact with the cutter-bar) may be obtained by means of the usual cutter-bar adjusting device 18, Fig. II. Indeed, the mower may have both the cutter-bar and the stops 11 adjustable in the manner indicated in Fig. II.

I claim as my invention:

1. In a mower including a frame, a cutter-bar, and a reel including cutter-blades adapted to sweep with shearing effect over said cutter-bar, the combination of means in said frame for rotatably supporting said reel, said means including an eccentric member, said eccentric member being angularly movable to shift said reel toward said cutter-bar, and yielding means tending so to move said eccentric member, the sweeping engagement of said cutter-blades with said cutter-bar reacting through the reel structure to oppose such movement of the eccentric member.

2. In a mower including a frame, a cutter-bar, and a reel including cutter-blades adapted to sweep with shearing effect over said cutter-bar, the combination of means in said frame for rotatably supporting said reel, said means including an eccentric member which is angularly movable in opposite directions for shifting said reel in and out relatively to said cutter-bar, a spring exerting a force tending to move said eccentric member in one direction, and the sweeping engagement of said cutter-blades with said cutter-bar reacting in opposition to said spring.

3. In a mower including a frame, a cutter-bar, and a reel including cutter-blades adapted to sweep with shearing effect over said cutter-bar, the combination of a bearing structure at each of the opposite ends of said reel for rotatably mounting the reel in said frame, each bearing structure including an eccentric member, each eccentric member being angularly movable to shift said reel relatively to said cutter-bar, resilient means in each bearing structure, said resilient means tending to move the eccentric members and shift said reel toward said cutter-bar, said eccentric members being independently movable, whereby said reel may assume a position of inclination with respect to said cutter-bar, and the sweeping engagement of said cutter-blades with said cutter-bar reacting in opposition to said resilient means.

4. In a mower including a frame, a cutter-bar, and a reel including cutter-blades adapted to sweep with shearing effect over said cutter-bar, the combination of a bearing structure at each of the opposite ends of said reel for rotatably mounting the reel in said frame, each bearing including a member angularly movable for shifting the reel relatively to said cutter-bar, resilient means effective upon each of said members and tending to shift said reel toward said cutter-bar, said members being severally movable through a relatively small interval, whereby said reel may assume a position of inclination with respect to said cutter-bar, and the sweeping engagement of said cutter-blades with said cutter-bar reacting in opposition to said resilient means.

LAWRENCE P. CAMPBELL.